(12) United States Patent
Kmita

(10) Patent No.: US 8,016,528 B2
(45) Date of Patent: Sep. 13, 2011

(54) BED DIVIDER APPARATUS AND METHOD FOR USE IN A PICKUP TRUCK BED

(75) Inventor: Gerard J. Kmita, Allen Park, MI (US)

(73) Assignee: JAC Products, Inc., Saline, MI (US)

( * ) Notice: Subject to any disclaimer, the term of this patent is extended or adjusted under 35 U.S.C. 154(b) by 596 days.

(21) Appl. No.: 11/877,780

(22) Filed: Oct. 24, 2007

(65) Prior Publication Data

US 2008/0101885 A1    May 1, 2008

Related U.S. Application Data

(60) Provisional application No. 60/863,050, filed on Oct. 26, 2006.

(51) Int. Cl.
*B60P 7/08* (2006.01)

(52) U.S. Cl. ......... 410/132; 410/129; 410/130; 410/139

(58) Field of Classification Search .................. 410/121, 410/129, 130, 132, 135, 139–142, 150; 296/24.4, 296/37.6; 224/42.33, 42.34, 403, 404; 220/530, 220/534, 535, 540–542, 544, 545, 551
See application file for complete search history.

(56) References Cited

U.S. PATENT DOCUMENTS

| 5,443,190 | A | 8/1995 | Cucheran et al. |
| 5,586,850 | A * | 12/1996 | Johnson ........................ 410/138 |
| 6,398,091 | B1 | 6/2002 | Muñoz et al. |
| 6,467,663 | B1 | 10/2002 | Kmita et al. |
| 6,513,688 | B2 | 2/2003 | Kmita et al. |
| 6,540,123 | B1 | 4/2003 | Kmita et al. |
| 7,273,336 | B2 | 9/2007 | Silamianos et al. |

* cited by examiner

*Primary Examiner* — Stephen Gordon
(74) *Attorney, Agent, or Firm* — Harness, Dickey & Pierce, P.L.C.

(57) ABSTRACT

A bed divider apparatus for use in a bed of a pickup truck. The divider apparatus includes a frame that supports first and second parallel disposed divider members each in the shape of a panel. The divider members are secured to one another so that one of the divider members is slidable relative to the other. A pair of user engageable fastening members can be used to secure the second divider member at a desired height relative to the first divider member. The frame is secured by end supports to a pair of tracks that are mounted on inside walls of the pickup truck bed. Thus, the divider apparatus can be positioned at various points along the lengths of the tracks. The apparatus enables larger cargo items to be restrained within the bed, while still enabling elongated items such as lumber planks, tubing, etc. to be supported on the full length of a floor of the bed without interference from the divider apparatus.

19 Claims, 8 Drawing Sheets

BED DIVIDER APPARATUS AND METHOD FOR USE IN A PICKUP TRUCK BED

CROSS REFERENCE TO RELATED APPLICATIONS

The present application claims priority from U.S. Provisional application Ser. No. 60/863,050, filed Oct. 26, 2006, the disclosure of which is hereby incorporated by reference into the present application.

FIELD

The present application relates to bed dividers, and more particularly to a bed divider adapted for use in a pickup truck.

BACKGROUND

Pickup trucks are used in a wide variety of applications to transport large and small cargo items. Often, such items need to be secured within the bed to prevent them from shifting while the vehicle is traveling, and particularly while the vehicle is accelerating or braking. Often tie down straps or cords are used for this purpose. As can be appreciated, the use of straps or cords can only provide limited effectiveness in securing various loads. Also, attempting to use straps or cords to secure various articles within a pickup truck bed can be time consuming and inconvenient for the user, often requiring the use to climb into the bed of the truck to secure and detach the straps or cords.

Accordingly, it would be highly desirable to provide a divider apparatus that can be adjustably positioned within a bed of a pickup truck, and which can restrain a wide variety of articles or cargo having various shapes and sizes. It would further be desirable to provide a bed divider apparatus that is able to partition an upper area of the bed while enabling a lower area of the bed to be unpartitioned, such as to allow long pieces of lumber to be placed on a floor of the bed while still enabling larger cargo items to be restrained by the divider apparatus.

SUMMARY

The present disclosure relates to a bed divider apparatus and method for use in a pickup truck bed. While the apparatus is especially well suited for use in the bed of a pickup truck, it will be appreciated that the apparatus could just as readily be used in other applications and/or vehicles, for example within the cargo area of a cargo van, within a railroad car, station wagon, SUV, etc.

In one embodiment the apparatus includes a frame member having an end support at each end thereof. Each end support includes a locking mechanism that enables the frame member to be supported from an associated, elongated track. The tracks are mounted to inside wall portions of the side walls of the bed of a pickup truck so as to face one another.

Secured to the frame member is a first divider member to which is secured a movable, second divider member. The second divider member is slidably secured to the first divider member. At least one securing mechanism is used to secure the second divider member at a desired position relative to the first divider member. In one implementation the first divider member has a dimension so that when the apparatus is secured between the sidewalls of a bed, and the second divider member is raised, a space exists between the bottom of the second divider member and the floor of the bed. In this manner long cargo items such as planks of lumber, sheets of plywood, plastic or steel tubing, etc. can fit underneath the lower edge of the second divider member. Even with the second divider member positioned in its raised position, the divider apparatus can still be used to restrain movement of larger cargo items by positioning the apparatus against the cargo items. If it is desired that the entire height of the cargo bed be partitioned off, then the second divider member can be lowered into contact, or closely adjacent to, the floor of the bed. In this manner, the divider apparatus forms a substantially complete bulkhead for partitioning the bed into two distinct sections. The ability to selectively partition the bed to enable the carrying of boards, panels, tubing, etc., simultaneously with the ability to restrain larger cargo items without interfering with placement of such elongated items, adds significant utility to the use of the bed.

In one implementation the end supports at the opposite ends of the frame member include actuating members that enable an individual to grasp same with one or more fingers, and to place the end support in an unlocked position relative to its associated track. Once both end supports are placed in their unlocked positions, the entire divider apparatus can be moved along the tracks and repositioned as needed, and then the end supports again placed in their locked positions. Thus, there is no need for a user to physically climb into the bed of the pickup truck to reposition the divider apparatus.

In still another implementation, the first divider member includes at least one opening that enables external elements such as bungee cords or other forms of tie down straps to be secured to the first divider member, to further enhance the utility of the apparatus.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, its application or uses.

Figure 1:
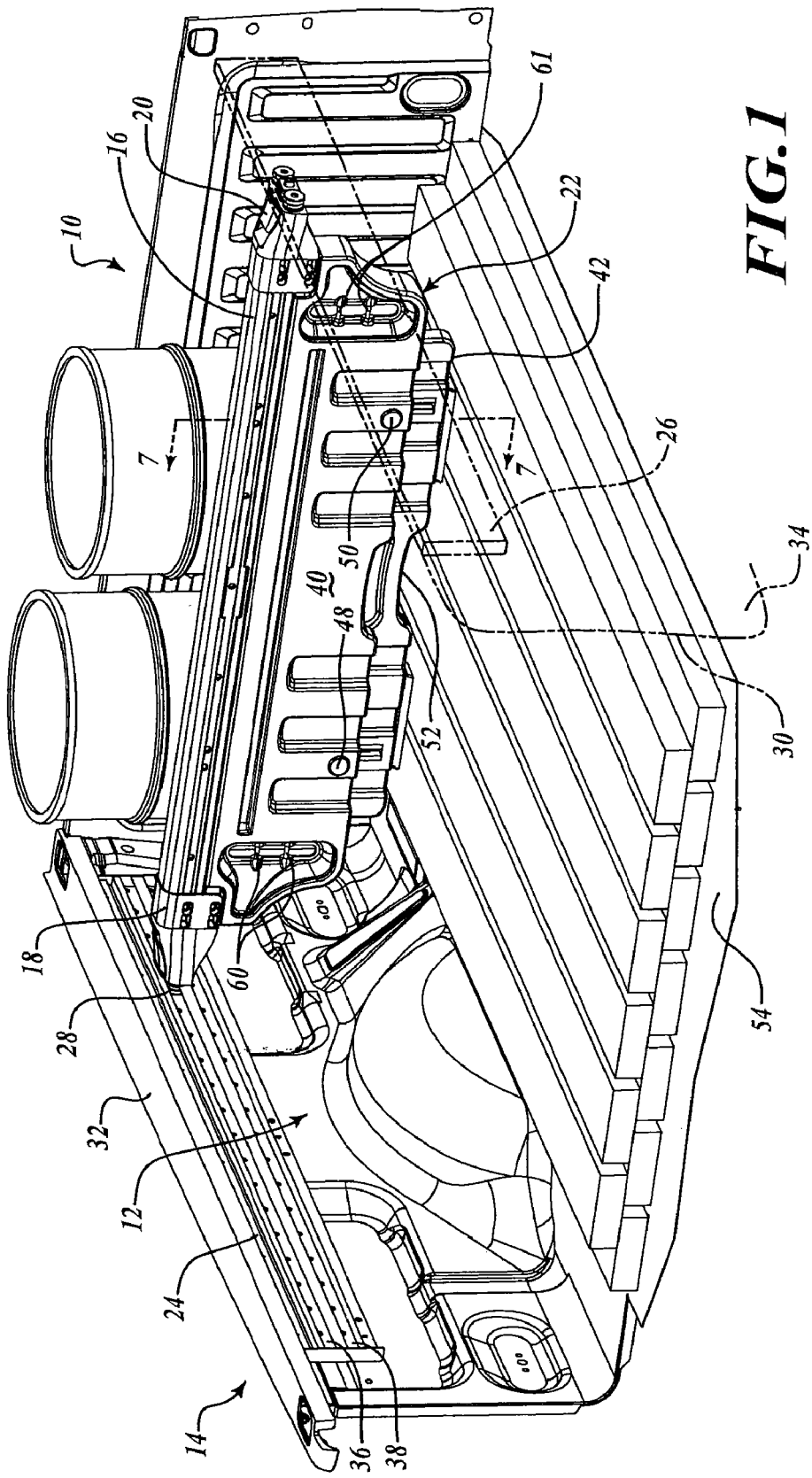
FIG. 1 is a perspective view of one embodiment of a divider apparatus of the present disclosure mounted within a bed of a pickup truck.

Referring to FIG. 1, there is shown a bed divider apparatus 10 in accordance with one embodiment of the present disclosure. In this implementation the apparatus 10 is used in a bed 12 of a pickup truck 14. However, it will be appreciated that the apparatus 10 could just as readily be implemented with other types of vehicles and in the interior areas of such other vehicles, and therefore is not limited to use only in the bed of a pickup truck. For example, the apparatus 10 could be used in the interior area of a cargo van, station wagon, sport utility vehicle (SUV), or even the trunk of a sedan-style automobile. It is expected that the apparatus 10 will find utility in connection with automotive vehicles, as well as with any structure that is movable and that requires articles being transported to be securely restrained against movement during transport.

In the implementation shown in FIG. 1, the apparatus 10 includes a frame member 16 having end supports 18 and 20 at opposite ends thereof. The frame member 16 also supports a divider assembly 22. The end supports 18 and 20 are supported from a pair of elongated tracks 24 and 26 that are fixedly positioned on inside surfaces 28 and 30, respectively, of sidewalls 32 and 34, respectively, of the bed 12. The frame member 16 is preferably formed from extruded aluminum or any other suitably strong material.

The tracks 24 and 26 are each illustrated as including a pair of parallel channels 36 and 38. It will be appreciated, however, that a track with only a single channel will suffice to support one of the end supports 18 or 20. The use of two parallel tracks 24 and 26, however, adds additional utility by providing one track that is associated with support of one of the end supports 18 and 20, while the other track can be used for auxiliary items such as tie down elements or other securing implements. Thus, by the use of two channels 36 and 38, positioning of the apparatus 10 will not be affected by the auxiliary securing implements that the user may desire to use on the tracks 24 and 26. The tracks 24 and 26 are preferably extruded from aluminum, but could be formed from other manufacturing processes and from other suitably strong materials.

Figure 2:
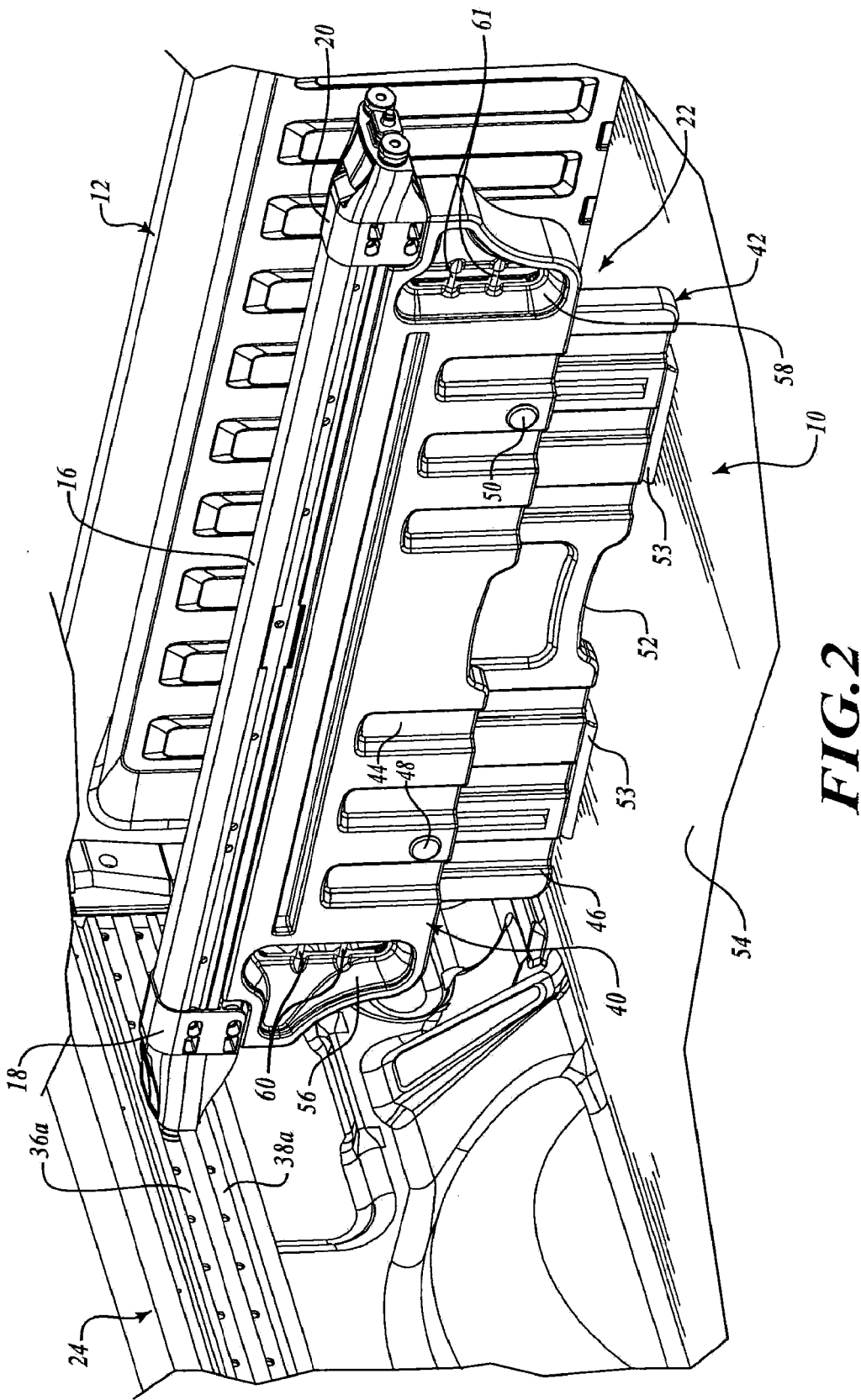
FIG. 2 is an enlarged perspective view of the apparatus of FIG. 1, with the second divider member of the divider assembly in its fully lowered position.

Referring to FIG. 2, an enlarged view of the divider apparatus 10 is shown. The divider assembly 22 is comprised of a first divider member 40 and a second divider member 42. The second divider member 42 is secured against the first divider member 40 but is able to slide vertically relative to the first divider member 40.

Figure 7:
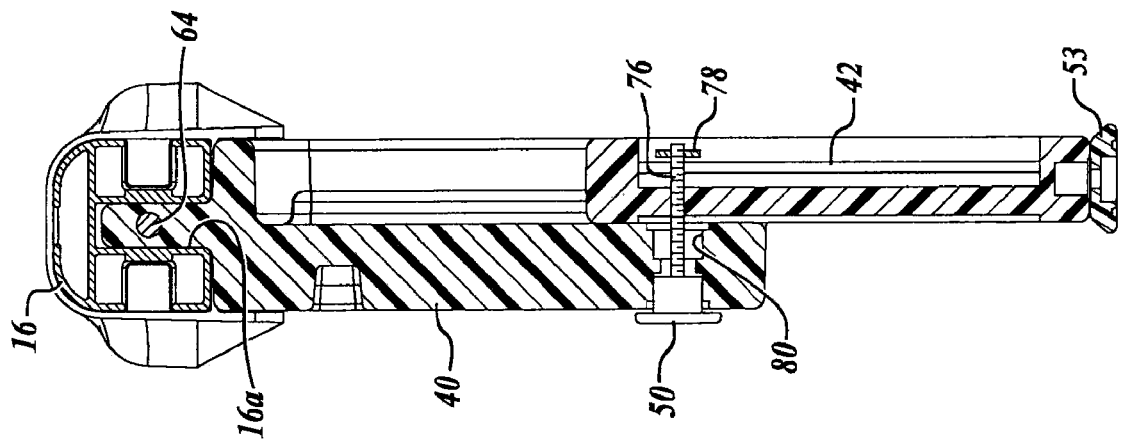
FIG. 7 is an end, cross-sectional view in accordance with section line 7-7 in FIG. 1 of the divider apparatus of FIG. 1.

With brief reference to FIG. 7, the first divider member 40 is fixedly secured within a channel 16a of the frame member 16 such as by threaded fasteners (not shown) or any other suitable means. A particular advantage of the frame member is the inclusion of elongated channels 16b, 16c, and 16d, which each enable independent, auxiliary tie down elements to be secured thereto. This significantly enhances the utility of the apparatus 10.

Referring further to FIG. 2, the first divider member 40 and second divider member 42 have corrugations 44 and 46, respectively that help to maintain alignment of the second divider member 42 as it is moved slidably relative to the first divider member 40. Fastening elements 48 and 50 form knobs that are easily manually graspable with the fingers of a single hand. This enables the second divider member 42 to be secured at the extended position shown in FIG. 2, or alternatively in the retracted position shown in FIG. 1, or at an intermediate position between the fully extended and fully retracted positions. A contoured area 52 enables the user to grasp the second divider member 42 with one hand to easily lift or lower the second divider member 42 into the desired position. Support feet 53 may optionally be secured to a lower edge of the second divider member.

Adjustable positioning of the second divider member 42 can be accomplished once fastening members 48 and 50 are loosened. The user then may lift or lower the second divider member 42 as needed to place it in the desired position. While the second divider member 42 is being held in the desired position, members 48 and 50 are then tightened. This serves to hold the second divider member 42 at the new position. When in the lowered position shown in FIG. 2, the divider assembly 22 forms a substantially full partition that creates two distinct areas within the bed 12. When the second divider member 42 is raised and repositioned as shown in FIG. 1, this enables elongated articles to extend underneath the divider assembly 22. As shown in FIG. 1, such articles may include elongated planks of lumber, sheets of plywood, tubing, conduit or other elongated items having dimensions requiring them to extend between a lower edge of the second divider member 42 and a floor 54 of the bed 12, and to thus utilize the full length of the bed 12. Thus, it is a significant advantage of the apparatus 10 that the apparatus is able to function as a partition for holding large items, such as the drums shown in FIG. 1, while still enabling narrow, elongated items to extend the full length of the bed 12 underneath the divider assembly 22.

With further reference to FIG. 2, the apparatus 10, in one embodiment, includes openings 56 and 58 formed in the first divider member 40. Retaining elements 60 and 61 are positioned within the openings 56 and 58 respectively. The retaining elements 60 and 61 may be steel or aluminum pins that are able to receive rubber or nylon tie down straps, bungee cords or any other form of strap-like securing element, to further assist in the securing of variously shaped and sized articles within the bed 12.

Figure 3:
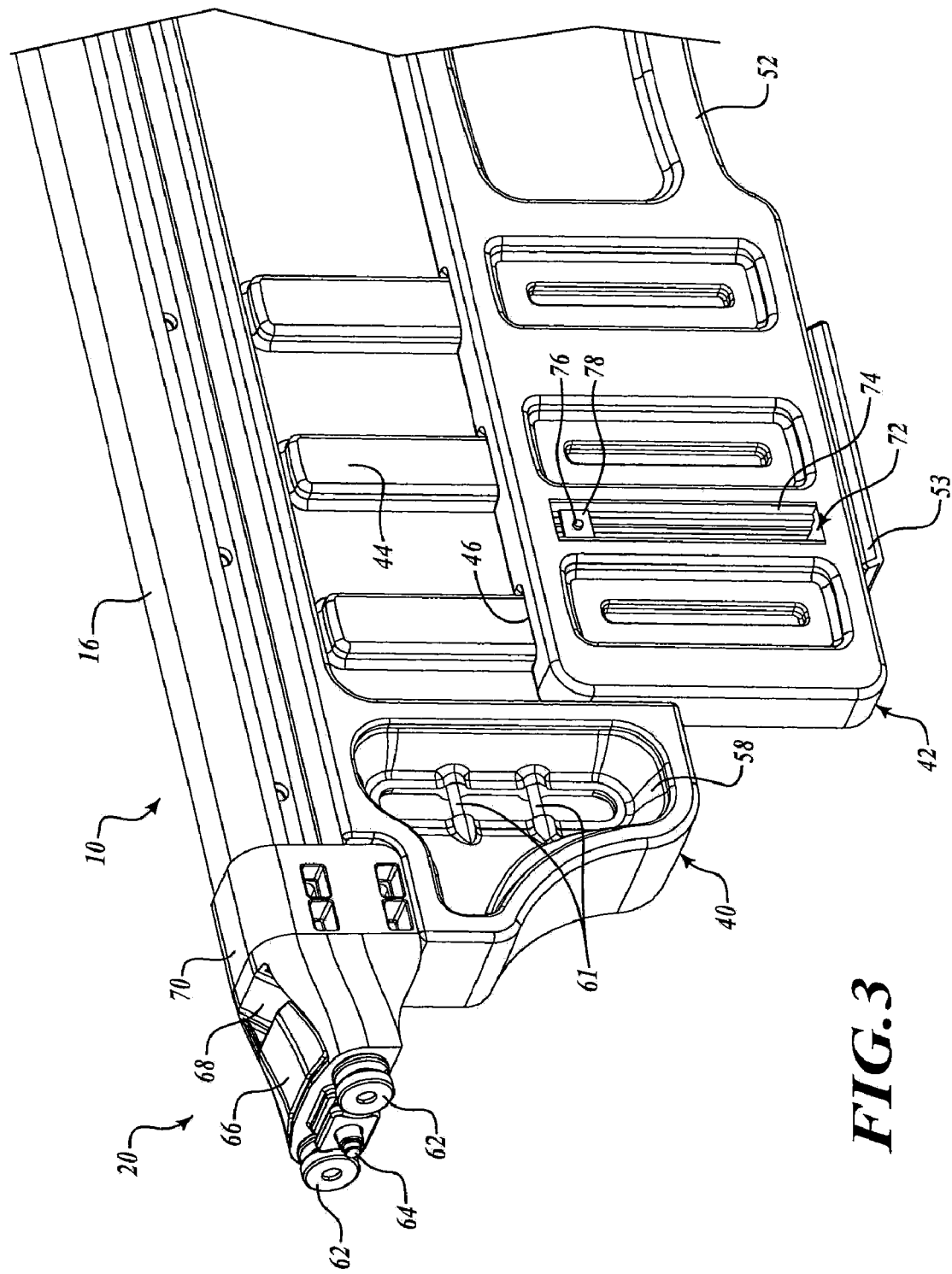
FIG. 3 is a perspective view of a portion of the divider apparatus illustrating the construction of the first and second divider members as well as one of the end supports.
Figure 4:
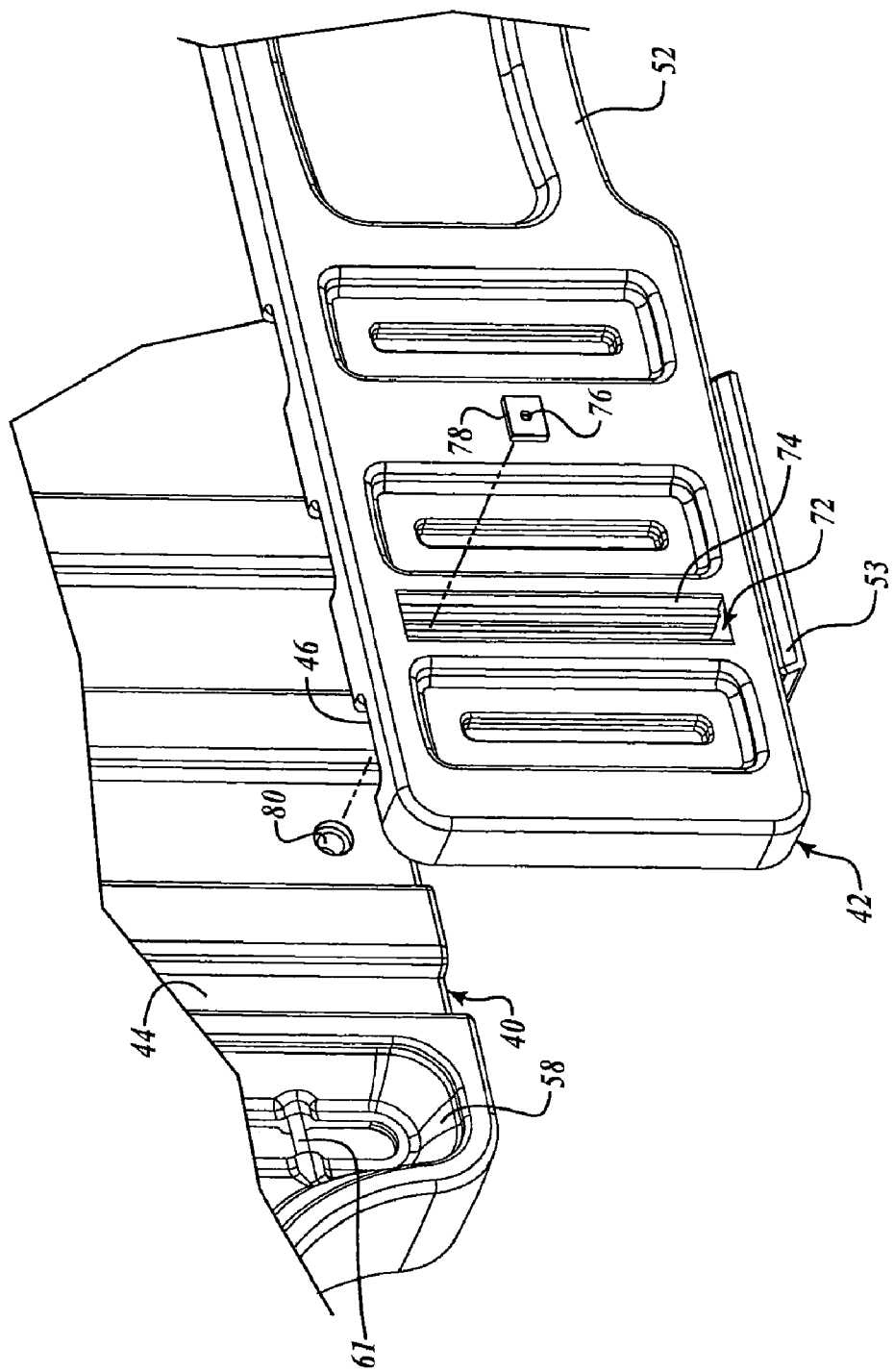
FIG. 4 is a perspective view of portions of the first and second divider members, as well as the tap plate used to help secure the second divider member to the first divider member.
Figure 4A:
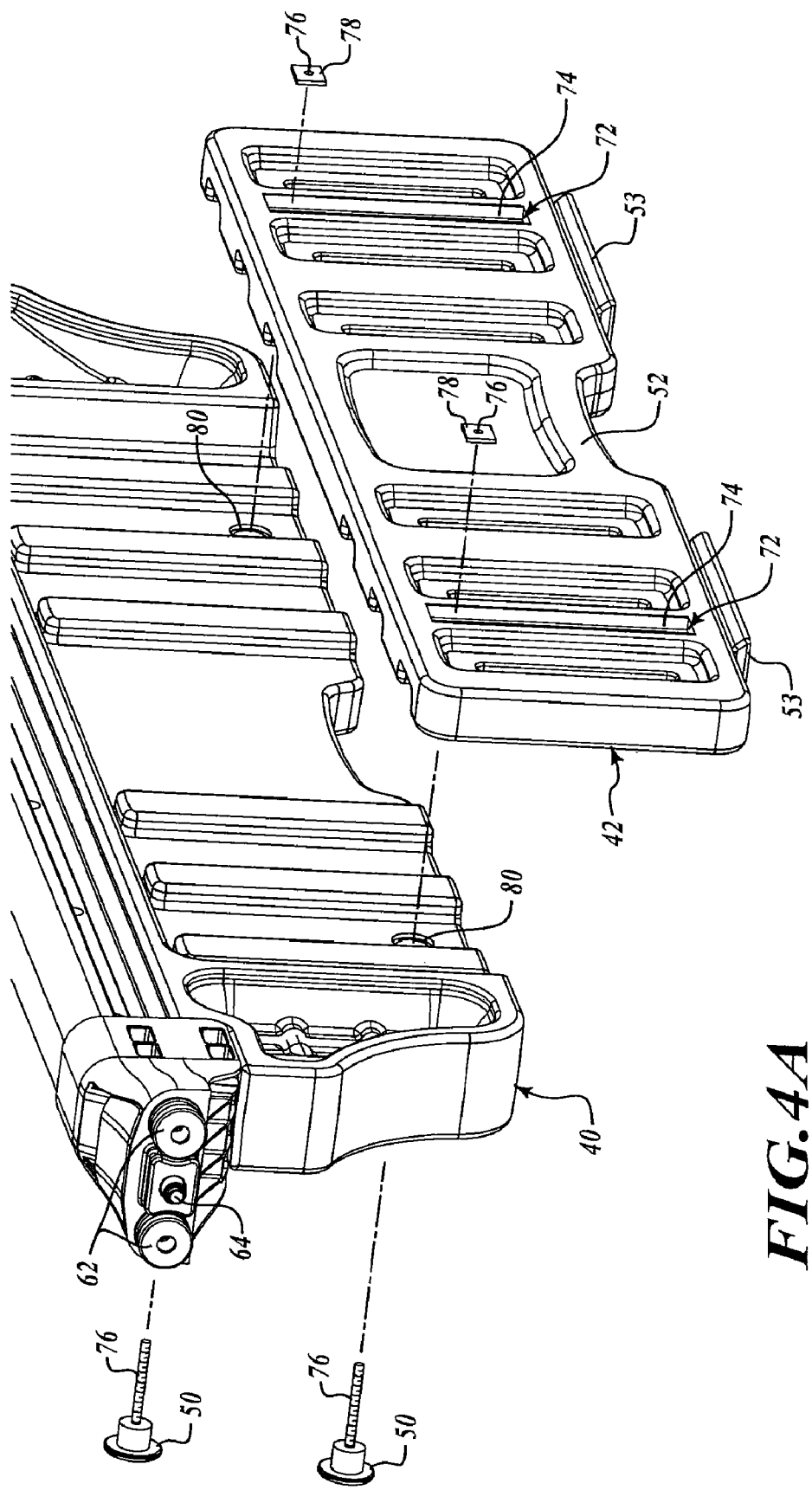
FIG. 4A is an exploded perspective view of a portion of the divider assembly.

Referring to FIG. 3, the end support 20 can be seen in greater detail. It will be appreciated that end supports 18 and 20, in this embodiment, are identical in construction. End support 20 includes a pair of guide rollers 62 and a locking pin 64. A user actuatable member 66 is formed in a recessed area 68 of a housing 70 of the end support 20. As will be described further in the following paragraphs, lifting of actuating member 66 enables the locking pin 64 to be withdrawn (i.e., retracted). This enables the entire divider apparatus 10 to be rolled along channels 38 of tracks 24 and 26 by the rollers 62. Referring further to FIGS. 3, 4 and 4A, the inner divider member 42 to includes a pair of elongated, vertical openings 72 each having track 74 disposed therein (only one such opening 72 being visible in the Figures). A threaded fastening element 76 associated with fastening member 50 extends through an opening 80 in the first divider member 40 and through the opening 72, and engages an opening in a tap plate 78. This enables the second divider member 42 to be secured (i.e., clamped) at a desired elevational position relative to the first divider member 40. In FIG. 3, it can also be seen how the corrugations 44 and 46 on the first and second divider members 40 and 42, respectively, cooperate to guide the second divider member 42 for sliding movement along first divider member 40. It will be appreciated that the construction of fastening members 48 and 50 is preferably identical, and that fastening member 48 uses a threaded tap plate 78 such as shown in FIG. 4A. Thus, the combinations of fastening members 48 and 50 and tap plates 78 operate to clamp and hold the second divider member 42 at two spaced apart positions. The assembled divider assembly 22 is illustrated in cross section in FIG. 7.

Figure 5:
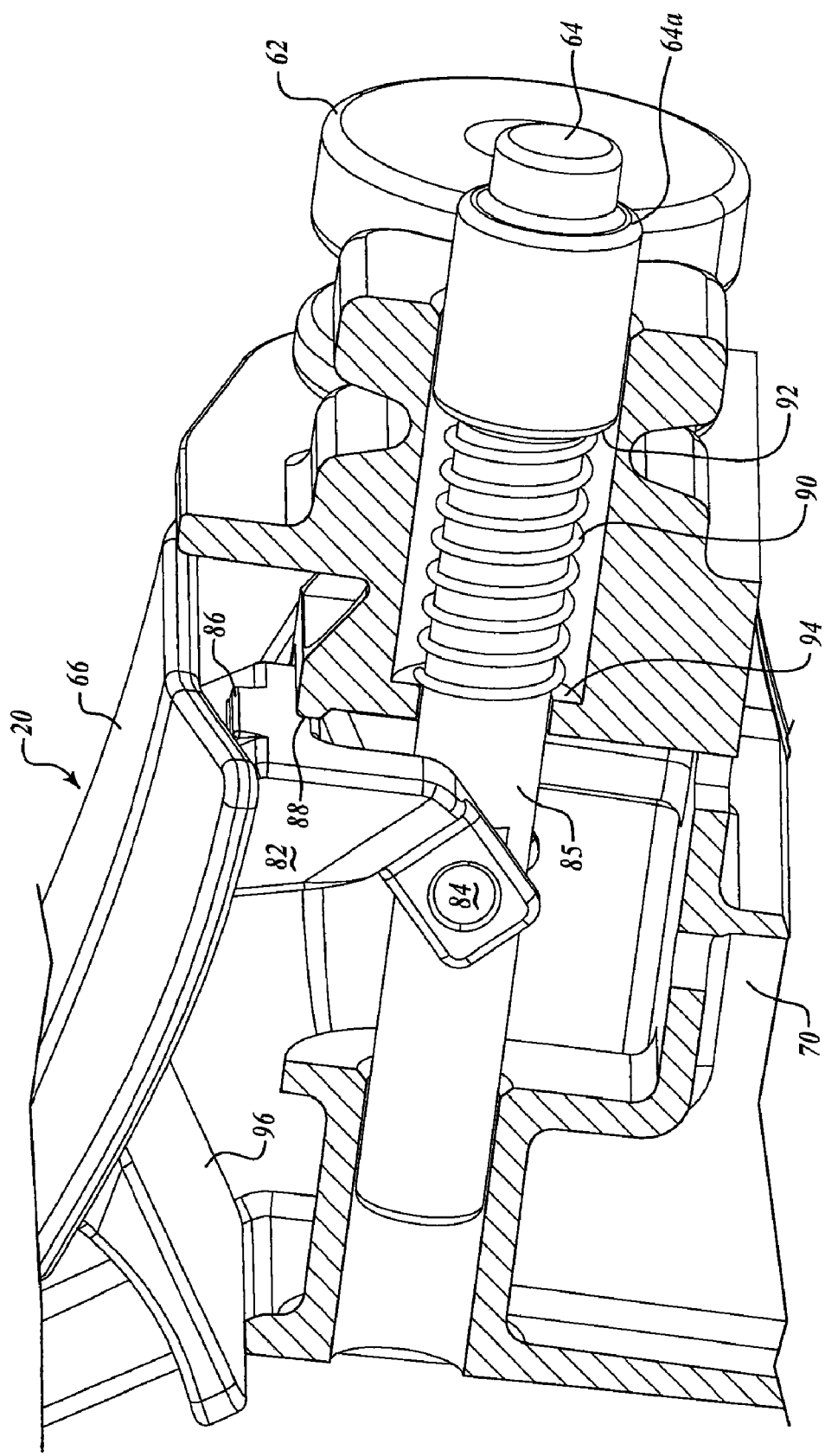
FIG. 5 is an enlarged perspective view of a portion of the end support illustrating the actuating member in its unlocked position, wherein the locking pin is fully retracted.
Figure 6:
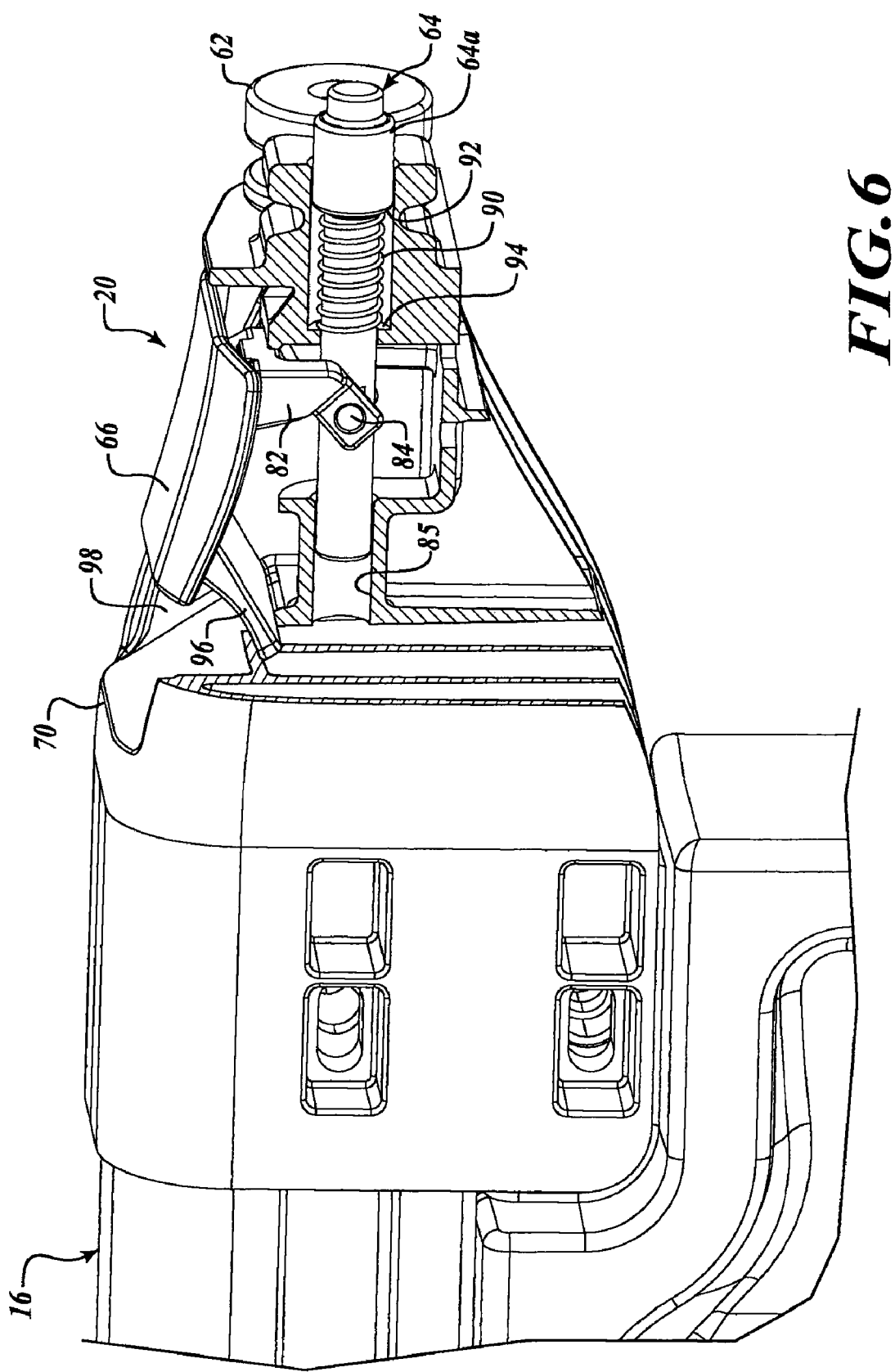
FIG. 6 is a side cross sectional view of the end support of FIG. 5, but with the actuating member in its closed position, wherein the locking pin is fully extended.

Referring now to FIGS. 5 and 6, the construction of end support 20 can be seen in greater detail. The actuating member 66 includes a clevis-like structure 82 which is secured via a pivot pin 84 to the locking pin 64. The locking pin 64 is slidably supported within a bore 85 in the housing 70, as indicated in FIG. 6. The locking pin 64 includes a tapered shoulder 64A which assists in seating the locking pin 64 in one of a plurality of longitudinally spaced apart holes formed in the channels 36 and 38 of both tracks 24 and 26. The holes are identified by reference numeral 38a in FIG. 2. Channel 36 includes holes 36a which may be used with external, auxiliary tie down components if needed. Alternatively, holes 36a can be used if the frame 16 of the apparatus 10 is positioned along the upper channels 36 of the tracks 24, 26 rather than along the lower channels 38.

With continued reference to FIGS. 5 and 6, FIG. 6 illustrates the locking pin 64 in its extended position. When the actuating member 66 is lifted, as indicated in FIG. 5, a shoulder 86 engages with a groove 88 formed in the housing 70 of the end support 20. This engagement holds the actuating member 66, and thus the locking pin 64, in the retracted position shown in FIG. 5 against the biasing force of a biasing spring 90. When the actuating member 66 is urged back towards its lowered position (FIG. 3), the coil spring 90 assists in extending (i.e., biasing) locking pin 64 into its extended position as shown in FIG. 6. The coil spring 90 is seated between a shoulder 92 of the locking pin 64 and a wall portion 94 of the housing 70. The actuating member 66 also includes a flange 96 that substantially closes off a recessed area 98 regardless of whether the actuating member 66 is in its raised or lowered position.

It will be appreciated that the divider apparatus 10 could be modified to suit a variety of different applications. For example, the second divider member 42 could be split into two portions, for example a left member and a right member, that are each positionable independently of one another via fastening members 48 and 50. Suitable pivoting structures could be integrated into the end supports 18 and 20 to also allow pivoting of the entire divider assembly 22 about the end supports 18 and 20.

The divider apparatus 10 of the present disclosure thus forms a means for securing large cargo items within a bed of a pickup truck, while still enabling elongated items such as planks of lumber, tubing, etc., to be carried in the bed without interference from the divider apparatus. The divider apparatus 10 thus significantly enhances the utility of a bed of a pickup truck.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A bed divider apparatus for use in a cargo bed of a vehicle, the apparatus comprising:
   a pair of tracks each having a channel, and being secured to opposing wall portions of the bed in facing relationship to one another;
   an elongated frame member sufficient to substantially span a distance separating the wall portions;
   a pair of end supports, one of each of said pair of end supports being secured at a respective end of said elongated frame member for engaging with said tracks to thus support said elongated frame member from said tracks;
   a divider assembly supported from said elongated frame member, said divider assembly including:
      a first divider member;
      a second divider member positioned adjacent and parallel to said first divider member; and
      at least one fastening assembly for securing said divider members to one another and permitting said second divider member to be moved slidably up and down relative to said first divider member and to be secured at a desired position relative to said first divider member to enable a variable sized opening to be formed between a floor of said bed and a longitudinal edge of said second divider member.

2. The apparatus of claim 1, wherein at least one of said tracks includes an additional channel formed parallel to its associated said channel.

3. The apparatus of claim 1, wherein at least one of said end supports includes an actuating member operatively coupled to a locking pin, and wherein said locking pin is adapted to be moved into and out of engagement with a portion of one of said tracks, by movement of said actuating member, to thus secure said end support against movement along said one of said tracks.

4. The apparatus of claim 3, wherein said actuating member is pivotally coupled to said one of said end supports and is moveable between a first position, wherein said actuating member is generally flush with an outer surface of said one of said end supports, to a second position in which said actuating member projects from said outer surface of said one of said end supports.

5. The apparatus of claim 1, wherein said second divider member includes an elongated opening having a track positioned therein, and said fastening assembly includes a fastening element that projects through the first divider member, and a tap plate that is threadably engaged with said fastening element and adapted to secure said second divider member against sliding movement relative to said first divider member when said fastening element is tightened to a locked position.

6. The apparatus of claim 1, wherein said one of said end supports includes a pair of guide rollers adapted to roll along a respective one of said tracks from which said one end support is supported.

7. A bed divider apparatus for use in a cargo bed of a vehicle, the apparatus comprising:
   a pair of tracks each having a channel, said tracks being secured to opposing wall portions of the bed in facing relationship to one another, each said track having a plurality of spaced apart locking positions;
   an elongated frame member sufficient to substantially span a distance separating the wall portions;
   a pair of end supports, each said end support being secured at one respective end of said elongated frame member for engaging with a respective one of said tracks to thus support said elongated frame member from said tracks;
   each said end support including a manually engageable actuating member operatively associated with a locking element, for enabling an individual to manually lock each said end support at a selected one of said spaced apart locking positions on its associated said track;
   a divider assembly supported from said elongated frame member, said divider assembly including:
      a first divider member;
      a second divider member positioned generally parallel and adjacent to said first divider member, and moveable slidably up and down relative to said first divider member, to enable said first and second divider members to be positioned to form a partition with either no opening or with an opening having a user selectable size, and wherein said opening is formed between a floor of said bed and a longitudinal edge of said second divider member; and at least one fastening assembly associated with one of said first and second divider members, that secures said first and second divider members to one another and permits said second divider member to be secured at a desired elevational position relative to said first divider member.

8. The apparatus of claim 7, wherein said actuating members associated with said end supports are each pivotally supported relative to its associated said end support.

9. The apparatus of claim 7, wherein each of said first and second divider members includes elongated structure that engages when said divider members are positioned against one another, and helps to maintain alignment of said divider members as the second divider member is moved slidably up and down relative to the first divider member.

10. The apparatus of claim 9, wherein said second divider member comprises a relief area that enables said individual to grasp said second divider member and facilitates elevational positioning of said second divider member.

11. The apparatus of claim 7, wherein each said end support includes a pair of guide rollers to assist in facilitating smooth movement of said end supports along said tracks when re-positioning said divider assembly.

12. The apparatus of claim 7, wherein each said actuating member is pivotally supported from an associated one of said end supports and moveable from a first position generally flush with an outer surface of said associated said one of said end supports, to a second position projecting from said associated one of said end supports.

13. The apparatus of claim 7, wherein said first divider member includes an opening formed therein, and wherein a retaining element is secured to said first divider member to project into said first divider member opening, said retaining element adapted to facilitate attachment thereto of an external fastening implement.

14. The apparatus of claim 7, wherein said divider assembly includes a pair of fastening assemblies spaced apart from one another, and each including a manually graspable member accessible from a common side of said divider assembly.

15. The apparatus of claim 7, wherein said second divider member is moveable from a first elevational position, wherein said divider assembly forms a substantially complete partition within said bed, to a second elevational position wherein said divider assembly forms only a partial partition that permits an elongated item to be placed on a floor of said bed along a full length of said bed.

16. A bed divider apparatus for use in a cargo bed of a vehicle, the apparatus comprising:

a pair of tracks each having a channel, said tracks being secured to opposing wall portions of the bed in facing relationship to one another, each said track having a plurality of spaced apart locking positions;

an elongated frame member having a length sufficient to substantially span a distance separating the wall portions;

a pair of end supports, each said end support being secured at one respective end of said elongated frame member for engaging with said tracks to thus support said elongated frame member from said tracks;

each said end support including a manually engageable and pivotally supported actuating member operatively associated with a locking element, for enabling an individual to manually lock said end supports at a desired pair of said spaced apart locking positions of said tracks;

a divider assembly supported from said frame member, said divider assembly including:

a first divider member;

a second divider member positioned against said first divider member and moveable slidably up and down along said first divider member between first and second elevational positions to form an opening having a user variable sized area, the opening being formed between the bed and a longitudinal edge of said second divider member and the opening extending substantially a full length of said second divider member; and at least one fastening assembly associated with one of said first and second divider members that secures said first and second divider members to one another and permits said second divider member to be secured at said first and second elevational positions;

said at least one fastening assembly including a manually graspable member having a threaded element and a threaded tap plate engaged therewith, said at least one fastening assembly enabling said first and second divider members to be clamped together against movement when said threaded element tightens said tap plate to clamp said first and second divider members against movement; and wherein said divider assembly forms a substantially complete partition for said bed when said second divider member is secured in said first position, and only a partial partition when said second divider member is secured in said second elevational position.

17. The apparatus of claim 16, wherein each said end support includes a pair of guide rollers adapted to engage with a respective one of said channels to facilitate smooth movement of said end supports of said frame member along said tracks when repositioning said frame member.

18. The apparatus of claim 16, wherein said first divider member includes an opening, and a retaining element projecting into said opening, said retaining element adapted to engage with an external fastening implement to assist in securing articles to said divider assembly.

19. The apparatus of claim 16, wherein said first and second divider members include structure that engages to keep said first and second divider members aligned when said second divider member is moved slidably relative to said first divider member.

\* \* \* \* \*